Patented Feb. 20, 1951

2,542,360

UNITED STATES PATENT OFFICE 2,542,360

PREPARATION OF ZINC-BERYLLIUM SILICATE PHOSPHORS

Jacob Roos, Eindhoven, Netherlands, assignor to General Electric Company, a corporation of New York No Drawing. Application December 8, 1947, Serial No. 790,435. In the Netherlands January 31, 1947

5 Claims. (Cl. 252—301.6)

My invention relates to luminescent materials generally, and more particularly to the preparation of fluorescent materials or phosphors of the zinc-beryllium silicate type.

Zinc-beryllium silicate activated with manganese, is an extensively used phosphor. This material is useful in gas or vapor discharge tubes in which it is excited to luminescence by ultraviolet radiations, as well as in cathode ray tubes in which it is excited to luminescence by electron bombardment. Widely varying proportions of the constituents have been proposed heretofore in various publications. The color of the luminescence may be varied within certain limits by a proper choice of the different proportions. Zinc-beryllium-manganese-silicate compositions have been compounded to produce yellow as well as red light. It has also been attempted, by varying the composition and particularly the proportion of the basic components to the silicic acid, to modify and improve other characteristics; for example, the luminous efficiency, the stability against the influence of the electrical discharge or electron bombardment, and the uniformity from batch to batch.

In accordance with processes referred to in the prior art literature a mixture of the oxides of zinc, beryllium, manganese and silicon is heated under certain conditions to a relatively high temperature, namely, about 1000 to 1300° C. Instead of the oxides, use may be made of materials which upon heating break down to yield the oxides; for example, carbonates or nitrates.

An object of my invention is to produce a product of high quantum efficiency. Another object is to produce a product of greater stability or maintenance, particularly in mercury vapor discharge tubes, wherein the usual blackening is reduced considerably. Further objects and advantages of my invention will appear from the following description.

According to my invention, the luminescent zinc-beryllium-manganese-silicate is obtained, as hertofore, by heating a mixture of the components zinc, beryllium, silicon and manganese. However, I have found that the above-mentioned objectives may be attained by a modified procedure which involves two separate firing steps wherein at least a part of the total beryllium component is withheld from the mixture during the initial firing step and is subsequently added to the mixture for the re-firing step to produce the desired luminescent material.

According to one modification of the process comprising my invention the total necessary quantity of the beryllium component is added only after the mixture of zinc, manganese and silicon components has been fired. In another advantageous modification, about half of the necessary quantity of the beryllium component is added initially and the other half after the first reaction mixture has been fired. The oxides, carbonates or nitrates are compositions suitable for the introduction of the various components in accordance with my invention.

The explanation for the improvement of light output and maintenance is not fully known. However, it may be reasonably assumed that in the diffusion process which produces the luminescent material it is only seldom possible to achieve a perfect equilibrium; in other words, that atoms remain on the surface of the luminescing crystals which have not yet found their exact place in the structure. It has been shown experimentally that this surface contributes most to the luminescence of the crystal. In accordance with the process comprising my invention, I obtain a crystal having a larger structure than the final product should have. This makes the crystallization easier, in addition to the fact that in the first phase or step of the process a relatively larger amount of silicic acid or silica is present than in the final product. The small beryllium ion has to be absorbed in the large crystal structure in the second phase or step of the process. However, it will be understood that the invention is not in any way limited by this explanation.

The following is an example of a particular composition which will illustrate the advantage to be obtained by this invention:

56.25 mol per cent ZnO
3.1 mol per cent Mn
7.0 mol per cent BeO
33.6 mol per cent $SiO_2$ By preparing this composition in accordance with the process heretofore employed wherein all the components were heated simultaneously, a quantum efficiency of 75% was obtained. However, when the same material was prepared in accordance with a process comprising this invention, in which half the quantity of BeO was added in the first step and the remainder in the second step, a quantum efficiency of 85% was obtained. These figures apply for the conversion of ultra-violet rays of 2537 Å. into visible light at room temperature.

In a low pressure mercury vapor discharge tube, the wall of which was covered with this luminescent material prepared in accordance with the prior art process, the light output was reduced 12% after 100 hours of operation; whereas when the material was prepared in accordance with the invention, a reduction of only 6% occurred in the same time.

For a further understanding of the invention, the following example is given for the preparation of a particular luminescent zinc-beryllium-manganese-silicate:

10667 g. zinc oxide in the form of a zinc oxide solution; for instance, ZnO dissolved in a solution of ammonia and ammonium carbonate.

400 g. manganese in the form of a manganese nitrate solution.

433 g. beryllium oxide in the form of a pure dry material.

5167 g. silicic acid in the form of a partly hydrolyzed ethyl silicate solution.

The zinc oxide and the manganese nitrate solutions are mixed in an evaporating dish with half the quantity of the beryllium oxide. Then the ethyl silicate solution is added. After evaporation of the liquids in the bowl, during a period of 20 hours, for example, the remaining material is ground in a mortar. The ground material is then heated in an oven at about 800° C. for about 3 hours, sifted if necessary, and then heated at 1230° C. for three hours. The reaction product thus obtained is then ground and sifted if necessary. The second half of the beryllium is then added and the mixture is refired. The final product is a material which luminesces yellow-red when irradiated with rays of 2537 Å. from a mercury vapor lamp.

The products made by the process comprising this invention may be used in mercury vapor tubes and in cathode ray tubes among others. They may, if desired, be mixed with other luminescent materials, for example, with materials emitting blue light.

What I claim as new and desire to secure by Letters Patent of the United States is:

1. The process of preparing luminescent manganese-activated zinc-beryllium silicate by the firing of a mixture of zinc, beryllium, silicon and manganese components of the group consisting of the oxides of those components and materials which upon heating break down to yield the said oxides, which comprises firing to reaction temperature of about 1000–1300° C. in two separate steps, at least about half of the total beryllium component being withheld from the mixture during the initial firing step and being subsequently added to the mixture for the re-firing step.

2. The process of preparing luminescent manganese-activated zinc-beryllium silicate by the firing of a mixture of zinc, beryllium, silicon and manganese components of the group consisting of the oxides of those components and materials which upon heating break down to yield the said oxides, which comprises firing to reaction temperature of about 1000–1300° C. in two separate steps, wherein the mixture in the first step is composed of the zinc, silicon and manganese components which are fired to form a silicate composition, after which the necessary quantity of beryllium component is added and the composition is re-fired.

3. The process of preparing luminescent manganese-activated zinc-beryllium silicate by the firing of a mixture of zinc, beryllium, silicon and manganese components of the group consisting of the oxides of those components and materials which upon heating break down to yield the said oxides, which comprises firing to reaction temperature of about 1000–1300° C. in two separate steps, wherein the mixture in the first step is composed of the zinc, silicon and manganese components and about one-half of the necessary beryllium component, which are fired to form a silicate composition, after which the remainder of the necessary quantity of beryllium component is added and the composition is re-fired.

4. The process according to claim 1 wherein the components zinc, beryllium, silicon and manganese are in the form of the corresponding oxides.

5. The process according to claim 1 wherein the components zinc, beryllium, silicon and manganese are in the form of the corresponding carbonates.

JACOB ROOS.

REFERENCES CITED

The following references are of record in the file of this patent:

UNITED STATES PATENTS

| Number | Name | Date |
|---|---|---|
| 2,443,728 | Froelich | June 22, 1948 |

Certificate of Correction

Patent No. 2,542,360                                February 20, 1951

JACOB ROOS

It is hereby certified that error appears in the printed specification of the above numbered patent requiring correction as follows:

Column 3, line 32, after the word "beryllium" insert *oxide*;

and that the said Letters Patent should be read as corrected above, so that the same may conform to the record of the case in the Patent Office.

Signed and sealed this 17th day of April, A. D. 1951.

[SEAL]

THOMAS F. MURPHY,
*Assistant Commissioner of Patents.*